//(12) United States Patent
Cheong et al.

(10) Patent No.: US 10,659,536 B2
(45) Date of Patent: May 19, 2020

(54) METHOD OF CONTROLLING INVERTERS

(71) Applicant: LSIS CO., LTD., Gyeonggi-do (KR)

(72) Inventors: Jeong-Yun Cheong, Gyeonggi-do (KR); Jong-Wook Jeon, Gyeonggi-do (KR)

(73) Assignee: LSIS CO., LTD., Anyang-Si, Gyeonggi-Do (KR)

( * ) Notice: Subject to any disclaimer, the term of this patent is extended or adjusted under 35 U.S.C. 154(b) by 273 days.

(21) Appl. No.: 15/170,799

(22) Filed: Jun. 1, 2016

(65) Prior Publication Data

US 2016/0357194 A1 Dec. 8, 2016

(30) Foreign Application Priority Data

Jun. 2, 2015 (KR) .................. 10-2015-0077882

(51) Int. Cl.
*H04L 29/08* (2006.01)
*H02M 7/48* (2007.01)
(Continued)

(52) U.S. Cl.
CPC ............ *H04L 67/125* (2013.01); *H02M 7/48* (2013.01); *H04L 1/1621* (2013.01);
(Continued)

(58) Field of Classification Search
CPC . H04L 1/1621; H04L 1/1858; H04L 67/1095; H04W 56/002
See application file for complete search history.

(56) References Cited

U.S. PATENT DOCUMENTS 5,577,043 A * 11/1996 Guo ...................... H04H 20/67
340/3.61
5,828,318 A * 10/1998 Cesar ................. G05B 19/0421
340/4.3
(Continued)

FOREIGN PATENT DOCUMENTS

CN 101154093 A 4/2008
CN 101336529 A 12/2008
(Continued)

OTHER PUBLICATIONS

Grama, Ananth; Gupta, Anshul; Karypis, George; Kumar, Vipin. "Introduction to Parallel Computing, Second Edition", Chapter 4, "Basic Communication Operations", 40 pages.*
(Continued)

*Primary Examiner* — George C Neurauter, Jr.
(74) *Attorney, Agent, or Firm* — K&L Gates LLP

(57) ABSTRACT

In some embodiments, an inverter system may include a plurality of inverters. In some embodiments, a method of controlling the plurality of inverters may include one inverter among the plurality of inverters set as a communication master to control other inverters set as communication slaves, may include the steps of generating a communication master signal in the communication master to transmit to the communication slaves, may verify whether or not the communication master signal is designated to be received by the communication slaves when the communication slaves receive the communication master signal, and may transmit a response signal with respect to the communication master signal to the inverters of the inverter system according to the verification result.

5 Claims, 6 Drawing Sheets

(51) Int. Cl.
*H04W 56/00* (2009.01)
*H04L 1/18* (2006.01)
*H04L 1/16* (2006.01)

(52) U.S. Cl.
CPC ........ *H04L 1/1858* (2013.01); *H04L 67/1095* (2013.01); *H04W 56/002* (2013.01)

(56) References Cited

U.S. PATENT DOCUMENTS

| | | | |
|---|---|---|---|
| 6,275,500 B1* | 8/2001 | Callaway, Jr. | H04W 74/06 370/346 |
| 6,453,438 B1* | 9/2002 | Miller | H04L 1/1614 709/227 |
| 6,467,065 B1 | 10/2002 | Mendez et al. | |
| 7,284,067 B2* | 10/2007 | Leigh | H04L 67/1008 709/238 |
| 7,353,259 B1* | 4/2008 | Bakke | G06F 9/44505 709/208 |
| 7,933,240 B2* | 4/2011 | Budampati | H04L 1/1887 370/328 |
| 8,274,957 B2* | 9/2012 | Walley | H04W 76/14 370/338 |
| 8,345,455 B2 | 1/2013 | Jeon | |
| 8,681,676 B2* | 3/2014 | Budampati | H04L 12/1895 370/312 |
| 9,185,593 B2* | 11/2015 | Song | H04L 47/10 |
| 9,306,409 B2* | 4/2016 | Yoo | H02J 7/007 |
| 9,407,093 B2* | 8/2016 | Cummings | H02J 1/102 |
| 9,548,875 B2* | 1/2017 | Patri | H04L 12/462 |
| 9,612,132 B2* | 4/2017 | Borleske | G01D 4/002 |
| 2006/0083039 A1 | 4/2006 | Oliveira et al. | |
| 2006/0274644 A1* | 12/2006 | Budampati | H04W 24/04 370/216 |
| 2009/0240930 A1* | 9/2009 | Barsness | G06F 9/4405 712/229 |
| 2010/0203835 A1* | 8/2010 | Ryu | H04W 56/0015 455/41.2 |
| 2010/0220733 A1* | 9/2010 | Eklund | H01L 31/1884 370/400 |
| 2011/0221269 A1* | 9/2011 | Borger | H02J 1/102 307/26 |
| 2012/0163234 A1* | 6/2012 | Sulc | H04L 61/35 370/254 |
| 2012/0290674 A1* | 11/2012 | Feng | H04W 40/246 709/206 |
| 2013/0201737 A1* | 8/2013 | Chiang | H02M 7/42 363/72 |
| 2014/0281082 A1 | 9/2014 | Bagger | |
| 2015/0076903 A1* | 3/2015 | Kanayama | H02J 3/40 307/24 |
| 2015/0341874 A1* | 11/2015 | Nguyen-Dang | H04W 52/0209 370/350 |
| 2016/0205157 A1* | 7/2016 | Chu | H04L 65/4076 370/312 |
| 2016/0212729 A1* | 7/2016 | Bulten | H04W 72/048 |
| 2016/0233709 A1* | 8/2016 | Lee | H02J 7/007 |
| 2016/0357194 A1* | 12/2016 | Cheong | H02M 7/48 |
| 2017/0331295 A1* | 11/2017 | Abeyasekera | H02J 3/386 |
| 2018/0146478 A1* | 5/2018 | Kim | H04W 72/005 |

FOREIGN PATENT DOCUMENTS

| | | |
|---|---|---|
| CN | 102332729 A | 1/2012 |
| CN | 203232113 U | 10/2013 |
| EP | 2 541 428 A1 | 1/2013 |
| JP | 2000-295894 A | 10/2000 |
| JP | 2004-173388 A | 6/2004 |
| JP | 2008-178236 A | 7/2008 |
| JP | 2008-271410 A | 11/2008 |
| JP | 2012-170297 A | 9/2012 |
| JP | 2012-257250 A | 12/2012 |
| JP | 2014-154998 A | 8/2014 |
| JP | 2014-207847 A | 10/2014 |
| JP | 2015-037350 A | 2/2015 |
| JP | 2015-46877 A | 3/2015 |
| KR | 10-1991-0002172 A | 1/1991 |
| KR | 10-2011-0022787 A | 3/2011 |
| KR | 10-2014-0119352 A | 10/2014 |
| KR | 10-2015-0095135 A | 8/2015 |
| WO | 2004/068687 A1 | 8/2004 |

OTHER PUBLICATIONS

Jehoshua Bruck; Ching-Tien Ho; Shlomo Kipnis; Derrick Weathersby. "Efficient Algorithms for All-to-All Communications in Multi-Port Message-Passing Systems". IEEE Transactions on Parallel and Distributed Systems, vol. 8, Issue 11, Nov. 1997, pp. 1143-1156, 12 pages.*
The Message Passing Interface Forum. "MPI: A Message-Passing Interface Standard", version 3.1, Jun. 4, 2015, 868 pages.*
Petteri Mannersalo; Alireza Keshavarz-Haddad; Rudolf Riedi. "Broadcast Flooding Revisited: Survivability and Latency". Proceedings of the IEEE INFOCOM 2007—26th IEEE International Conference on Computer Communications, p. 652-660, May 1-12, 2007, 9 pages.*
A. Rahman, W. Olesinski and P. Gburzynski. "Controlled Flooding in Wireless Ad-hoc Networks", University of Alberta Department of Computing Science, 2004, 6 pages. (Year: 2004).*
Seung-Joon Choi, Ki-Hyuk Kwon, and Sang-Jo Yoo. An Efficient Cross-Layer based Flooding Algorithm with Retransmission Node Selection for Wireless Sensor Networks, 22nd International Conference on Advanced Information Networking and Applications—Workshops, 2008, 8 pages. (Year: 2008).*
Luis Rodrigues and Michel Raynal. "Atomic Broadcast in Asynchronous Crash-Recovery Distributed Systems and Its Use in Quorum-Based Replication", IEEE Transactions on Knowledge and Engineering, vol. 15, No. 5, Sep./Oct. 2003, 12 pages. (Year: 2003).*
Luis Rodrigues and Michel Raynal. "Atomic Broadcast in Asynchronous Crash-Recovery Distributed Systems", Proceedings of the 20th IEEE International Conference on Distributed Computing Systems, Apr. 2000, 8 pages. (Year: 2000).*
Lucia Keleadile Ketshabetswe, Adamu Murtala Zungeru, Mmoloki Mangwala, Joseph M. Chuma, and Boyce Sigweni. "Communication protocols for wireless sensor networks: A survey and comparison", 2019, 43 pages. (Year: 2019).*
Richard Ekwall and Andre Schiper. "Solving Atomic Broadcast with Indirect Consensus", Ecole Polytechnique Federale de Lausanne, Technical Report LSR/2006/01, 2006, 24 pages. (Year: 2006).*
Extended European Search Report dated Mar. 17, 2017 issued in corresponding European Application No. 16169919.4.
Korean Notice of Allowance dated May 1, 2017 issued in corresponding Korean Application No. 10-2015-0077882.
Japanese Office Action dated Jul. 11, 2017 in connection with the counterpart Japanese Patent Application No. 2016-110557.
Korean Office Action dated Aug. 9, 2016, in 4 pages.
Chinese Office Action for related Chinese Application No. 201610383478.6; dated Sep. 28, 2018; (6 pages).

* cited by examiner

PRIOR ART

METHOD OF CONTROLLING INVERTERS

CROSS REFERENCE TO RELATED APPLICATIONS

This application claims the benefit of Korean Patent Application No. 10-2015-0077882, filed on Jun. 2, 2015, entitled "METHOD OF CONTROLLING INVERTERS", which is hereby incorporated by reference in its entirety.

BACKGROUND

Technical Field

Embodiments of the present disclosure relates to methods of controlling inverters.

Description of the Related Art

In an inverter system in which multiple inverters are connected to each other, the multiple inverters are classified into a single master inverter and the remaining follower inverters using a master/follower function. And then, the inverter system controls the single master inverter to monitor operations of the follower inverters, or transmits an instruction or data required for the single master inverter.

For this purpose, a master inverter and master followers are connected to each other through a communication to transmit and receive communication data. In order to transmit and receive the communication data between the master inverter and the master followers, a single inverter serves as a communication master and the remaining inverters serve as communication slaves.

The communication mater transmits communication data to the communication slaves. If exchange number data of a communication slave is included in a receiving exchange number contained in a communication master signal, the communication slave transmits response data to the communication master with respect to the communication data received from the communication master. Through such a process, the communication master stores information related to all communication slaves so that there may be a problem in which the communication slaves cannot afford to serve as the communication master when a malfunction of the communication master or a communication interruption occurs. With such a reason, an inverter of an inverter system may be difficult to change a communication master.

This problem may cause inconvenience to a user of the inverter system. For example, when abnormality occurs in a motor or an inverter, each inverter represents only own malfunction mode according to a current technology, so that there is a problem in which a user should check all inverters which have been installed.

Since an inverter system operates systematically, a safety function capable of managing a generable abnormality of a motor or an inverter is provided in the inverter. Such a safety function includes an interlock function. The interlock function is a safety function which stops an operation of a malfunction motor to substitute other motor in a non-activation state with the malfunction motor when the malfunction occurs in the motor.

When a user activates such an interlock function, since a motor operates a pump system in external appearance even though a malfunction occurs in a motor, it may be difficult to immediately find out whether or not a malfunction occurs.

As described above, in accordance with the prior art, since an inverter stores only own inverter information therein, it may be difficult to immediately manage abnormalities of other inverters, a motor, and a communication in a system.

SUMMARY

It is an object of some embodiments of the present disclosure is to provide a method of controlling inverters by enabling all inverters of the inverter system to receive and process a communication signal to be transmitted from one of the inverters, so that a malfunction or a communication interruption occurred in an inverter may be inspected by other inverters.

Also, another object of some embodiments of the present disclosure is to provide a method of controlling inverters by enabling other inverter to serve as a communication master since all inverters store information related to other inverters, even though a malfunction occurs in an inverter set as the communication master.

Problems to be addressed by some embodiments of the present disclosure are not limited to the described above, other problems not mentioned above will be clearly understood by those skilled in the art from the following description.

Among embodiments, in an inverter system including a plurality of inverters according to one embodiment of the present disclosure, a method of controlling the plurality of inverters in which one inverter among the plurality of inverters is set as a communication master to control other inverters set as communication slaves, includes the steps of generating a communication master signal in the communication master to transmit to the communication slaves, verifying whether or not the communication master signal is designated to be received by the communication slaves when the communication slaves receive the communication master signal, and transmitting a response signal with respect to the communication master signal to the inverters of the inverter system according to the verification result.

Detailed disclosures of other embodiments will be included in a detailed description and the accompanying drawings.

Advantages and/or features, and a method for attaining them of the present disclosure will be apparent from embodiments detailed set forth herein in conjunction with the accompanying drawings. However, the present disclosure is not limited to the embodiments set forth herein and it will be implemented in different forms, but these embodiments are also the teachings of the present disclosure to those skilled in the art, will be provided to tell the full scope of the present disclosure, and the present disclosure will only be defined by the appended claims. Throughout the specification, the same reference numerals refer to like components.

Therefore, in accordance with some embodiments of the present disclosure, all inverters of the inverter system may receive and process a communication signal to be transmitted from one of the inverters, so that a malfunction or a communication interruption occurred in an inverter may be inspected by other inverters.

Also, in accordance with some embodiments of the present disclosure, even though a malfunction occurs in an inverter set as a communication master, other inverter may serve as the communication master since all inverters store information related to other inverters.

DETAILED DESCRIPTION

Hereinafter, embodiments of the present disclosure will be described in detail with reference to the accompanying drawings.

Figure 1:
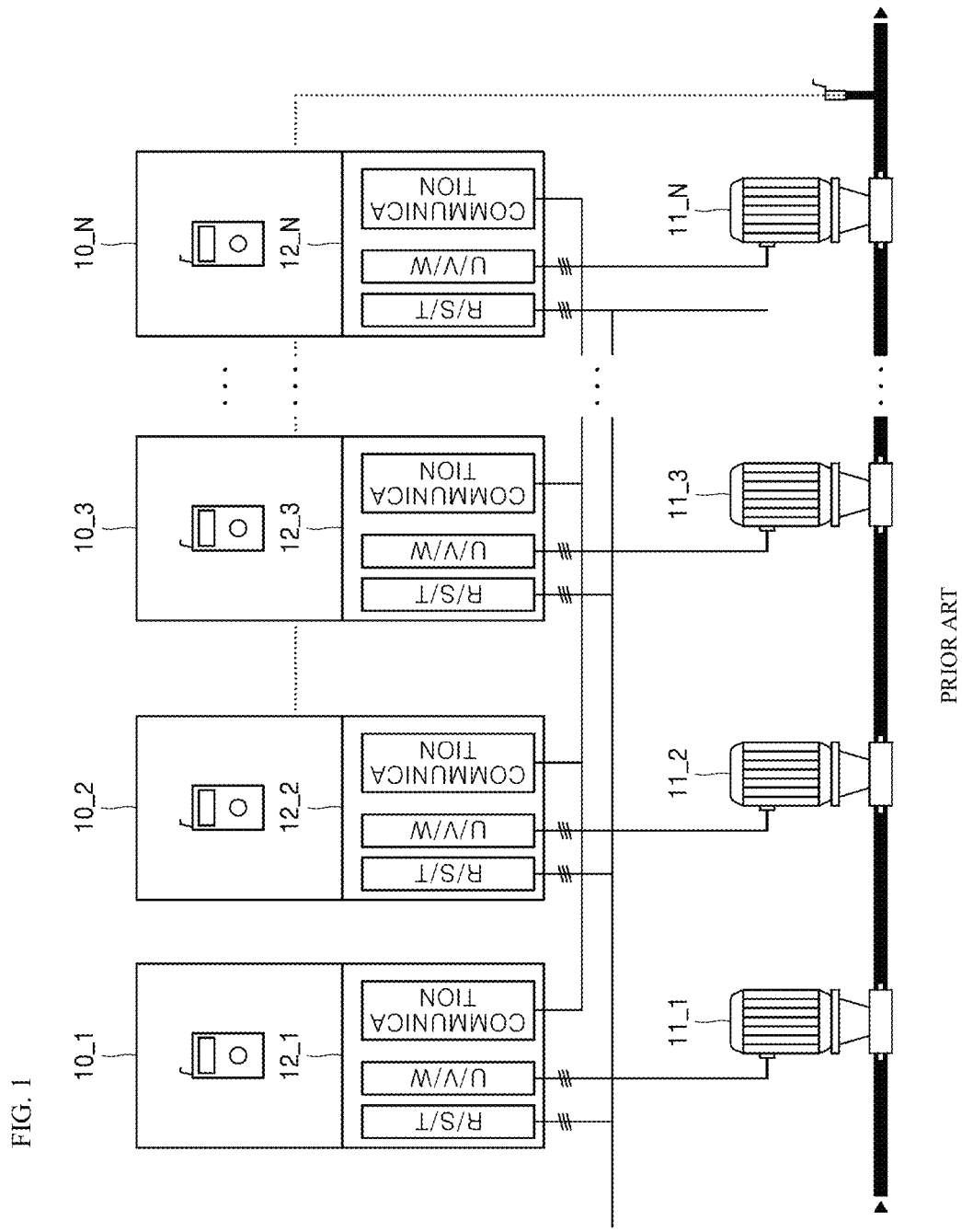
FIG. 1 is a diagram illustrating a pump system, according to the prior art.

FIG. 1 is a diagram illustrating a pump system. An embodiment of FIG. 1 is an embodiment in which a plurality of inverters systematically operates in communication with each other.

With reference to FIG. 1, a pump system includes inverters 10_1, 10_2, 10_3, . . . , 10_N, and motors 11_1, 11_2, 11_3, . . . , 11_N connected to the inverters 10_1, 10_2, 10_3, . . . , 10_N.

The inverters 10_1, 10_2, 10_3, . . . , 10_N include inverter signal input/output boards 12_1, 12_2, 12_3, . . . , 12_N. The inverter signal input/output boards 12_1, 12_2, 12_3, . . . , 12_N are designed to connect to various signals and a power supply which is required for the inverters 10_1, 10_2, 10_3, . . . , 10_N.

Each of the inverter signal input/output boards 12_1, 12_2, 12_3, . . . , 12_N is connected through a single communication line so as to transmit and receive important information in an inverter system in which a plurality of inverters are connected, and controls the pump system to generate a desired power using the transmitted and received information.

As shown in FIG. 1, in order to enable the inverters 10_1, 10_2, 10_3, . . . , 10_N to communicate with each other and to be controlled, a master/follower function should be used. The master/follower function controls one of the inverters 10_1, 10_2, 10_3, . . . , 10_N to serve as a master inverter and the remaining thereof to serve as follower inverters.

Also, in order to set a parameter of each of the inverters 10_1, 10_2, 10_3, . . . , 10_N, keypads 13_1, 13_2, 13_3, . . . , 13_N located in the inverter signal input/output boards 12_1, 12_2, 12_3, . . . , 12_N are used.

As described above, when the master/follower function of the inverter is used, communication data is transmitted and received between the inverters for a systematic control, and a single communication master and communication slaves are configured through a setting of the inverters.

Figure 2:
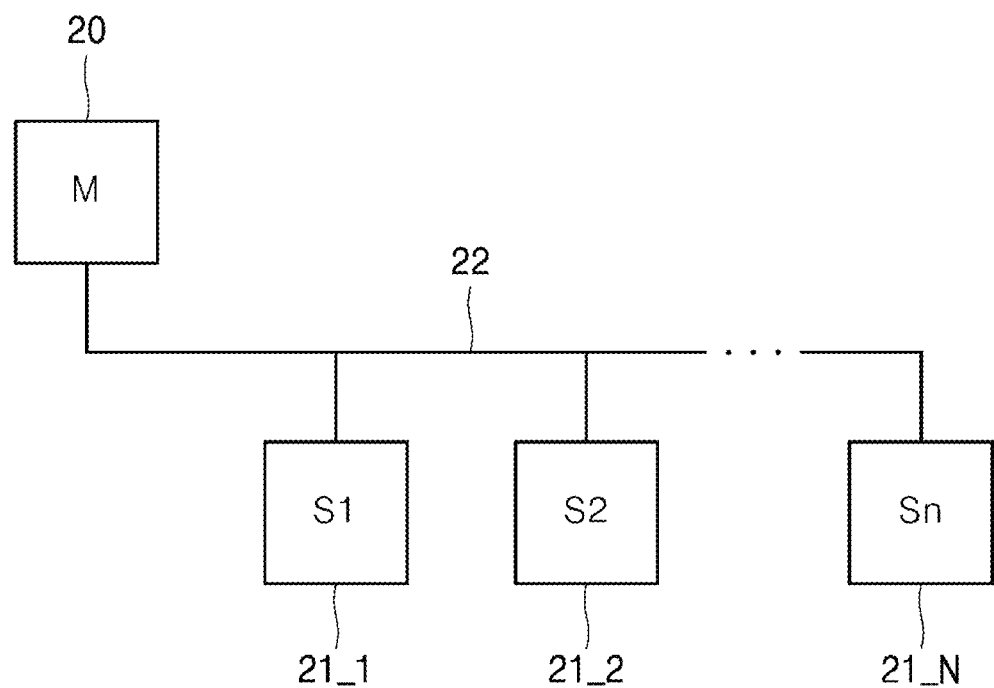
FIG. 2 is a block diagram illustrating a communication master and communication slaves in a master/follower function, according to some embodiments of the present disclosure.

FIG. 2 is a block diagram illustrating a communication master and communication slaves in a master/follower function.

With reference to FIG. 2, a single communication master 20 and a plurality of communication slaves 21_1, 21_2, . . . , 21_N exist, and the communication master 20 and the communication slaves 21_1, 21_2, . . . , 21_N are connected to each other through a single communication line 22. Here, the communication line 22 for a bidirectional communication may be implemented by a 485 communication, a controller Area Network (CAN) communication, and the like.

Giving an explanation in connection with FIGS. 1 and 2, when a master inverter 10_1 among the inverters 10_1, 10_2, 10_3, . . . , 10_N is set as the communication master 20, the remaining follower inverters 10_2, 10_3, . . . , 10_N serve as the communication slaves 21_1, 21_2, . . . , 21_N.

Unlike such an embodiment, the master inverter 10_1 and the communication master 20 may not be the same as each other. For example, if one inverter 10_2 among the follower inverters 10_2, 10_3, . . . , 10_N is set as the communication master 20, the master inverter 10_1 and the remaining follower inverters 10_3, . . . , 10_N serve as the communication slaves 21_1, 21_2, . . . , 21_N.

Figure 3:
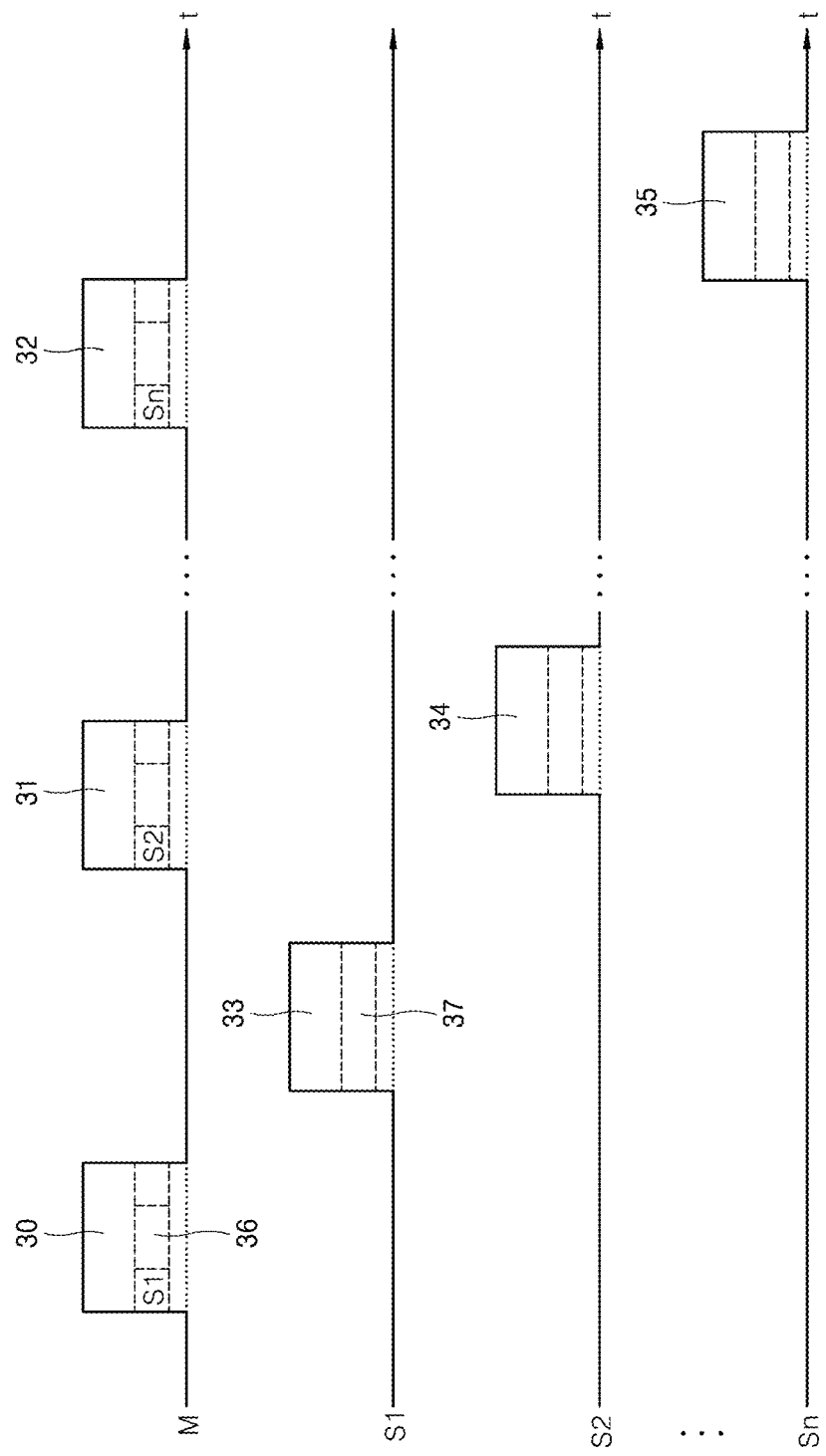
FIGS. 3 and 4 are diagrams for describing data to be transmitted and received between a communication master and communication slaves, according to some embodiments of the present disclosure.
Figure 4:
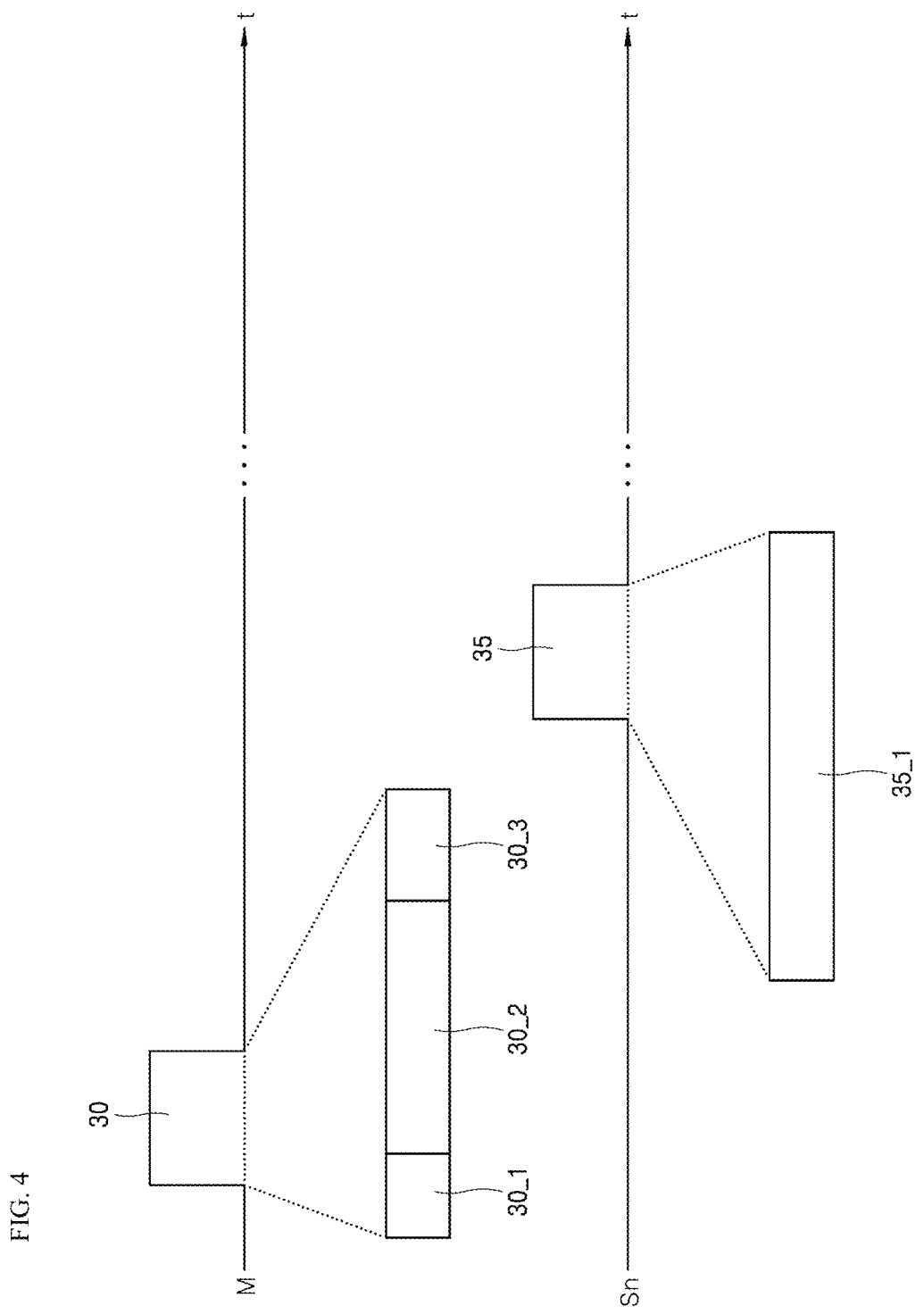

FIGS. 3 and 4 are diagrams for describing data to be transmitted and received between a communication master and communication slaves.

With reference to FIGS. 3 and 4, a communication master M generally transmits communication data 30, 31, and 32 to communication slaves S1, S2, . . . , Sn, which are connected to a system, so as to request required information from the communication slaves S1, S2, . . . , Sn. The communication slaves S1, S2, . . . , Sn process only the communication data from the communication master M to analyze and transmit the required information thereto.

As shown in FIG. 4, a communication master signal 30 transmitted from the communication master M includes a receiving exchange number 30_1, major data 30_2, and an error check 30_3. The communication slaves S1, S2, . . . , Sn receive and process the communication master signal 30 of the communication master M. In particular, if communication slave's own exchange number information is included in the receiving exchange number 30_1 of the communication master signal 30, the communication slaves S1, S2, . . . , Sn transmit response signals 33, 34, and 35 to the communication master M, in response to the communication master signal 30 received from the communication master M. At this point, the response signals 33, 34, and 35 are signals corresponding to the communication master signal 30 received from the communication master M and containing slave own state information to be transmitted to the communication master M.

If receiving exchange number information of a communication slave 1 S1 is included in a receiving exchange number of data 36 of the master signal 30 to be transmitted by the communication master M and is transmitted therefrom, the communication slave 1 S1 receives the communication master signal 30 from the communication master M. Thereafter, the communication slave 1 S1 verifies that the receiving exchange number information thereof is included in the receiving exchange number of the data 36 of the communication master signal 30 and transmits the response signal 33 to the communication master M. Then, the communication master M stores state information regarding the communication slave 1 S1 with reference to the response signal 33.

Also, if exchange number information of a communication slave 2 S2 is included in the data 36 of the communication master signal 31 and is transmitted by the communication master M, the communication slave 2 S2 verifies that the exchange number information thereof is included in a receiving exchange number of the data 36 of the communication master signal 31 received from the communication master M. And, the communication slave 2 S2 transmits a response signal 34 with respect to the communication master signal 31 to the communication master M. Thereafter, the communication master M stores state information regarding the communication slave 2 S2 with reference to the response signal 34.

Afterward, the communication master M transmits a communication master signal 32 to a next communication slave n Sn, and the communication slave n Sn receives the communication master signals 30, 31, and 32 from the communication master M. After receiving the communication master signals 30, 31, and 32, the communication slave n Sn generates and transmits a response signal 35 to the communication master M, in response to only the communication master signal 32 in which exchange number information of the communication slave n Sn is included. At this point, the communication slave n Sn may generate a response signal including state information 35_1 of the communication slave n Sn as shown in FIG. 4, and transmit the response signal to the communication master M. And thus, the communication master M stores the state information regarding the communication slave n Sn with reference to the response signal 35.

As described above, when receiving the response signals 33, 34, and 35 from the communication slaves S1, S2, . . . , Sn, the communication master M stores the state information of the communication slaves S1, S2, . . . , Sn, which transmit the response signals, on the basis of the response signals 33, 34, and 35. However, since the communication master M has information regarding all communication slaves S1, S2, . . . , Sn, when a malfunction occurs in the communication master M or a communication is interrupted, there is a problem in which the communication slaves S1, S2, . . . , Sn may not serve as the communication master M.

Figure 5:
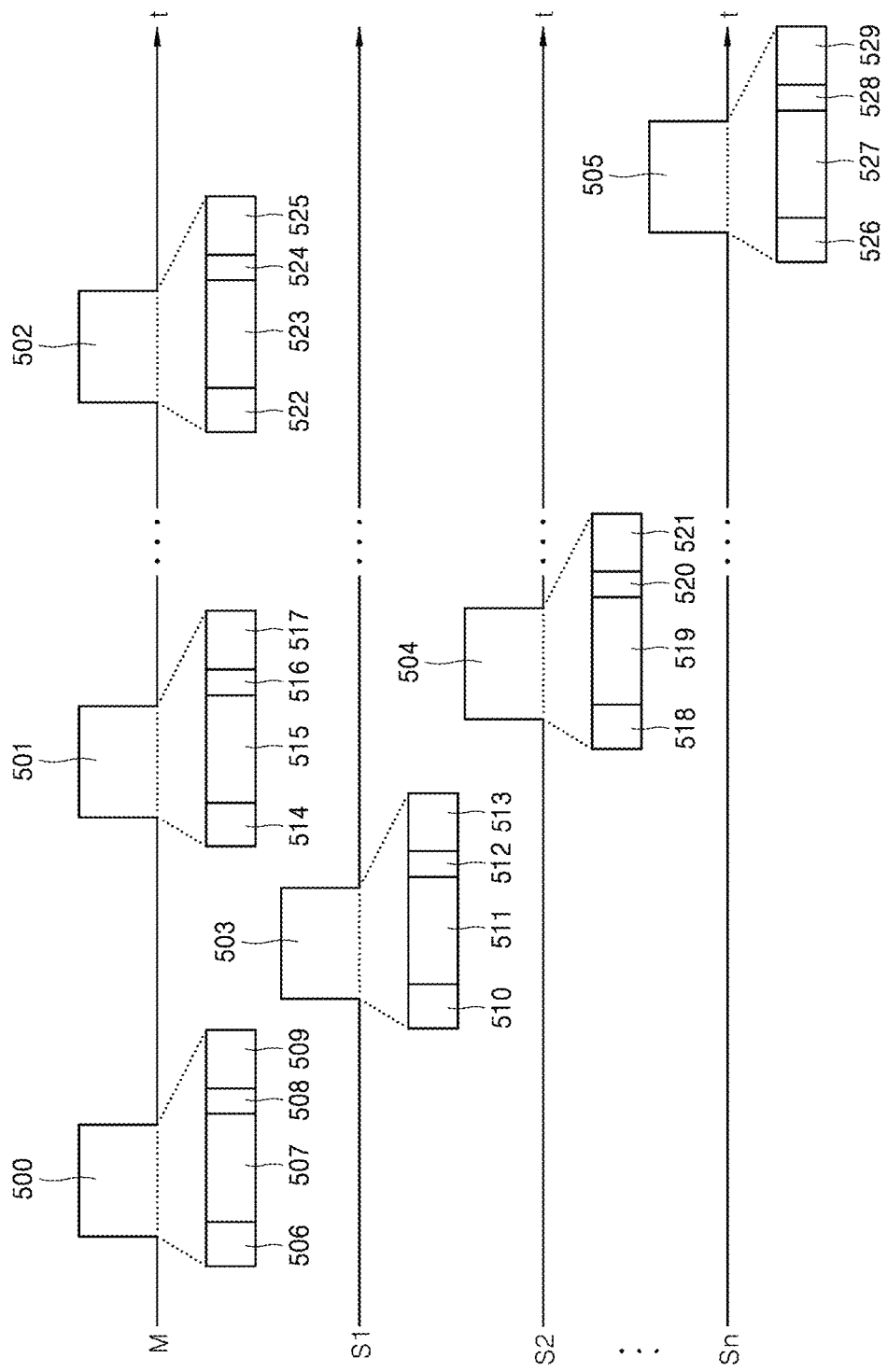
FIG. 5 is a diagram for describing data to be transmitted and received between a communication master and communication slaves according to one embodiment of the present disclosure.

FIG. 5 is a diagram for describing data to be transmitted and received between a communication master and communication slaves according to one embodiment of the present disclosure. In one embodiment of FIG. 5, among inverters of the inverter system, a master inverter may be set as a communication master and the remaining follower inverters may be set as communication slaves to transmit and receive a communication signal. Also, in another embodiment of FIG. 5, one inverter among the follower inverters may be set as a communication master and the master inverter and the remaining follower inverters may be set as communication slaves to transmit and receive a communication signal.

A communication master M transmits a communication master signal 500 including calling exchange number information 506, data information 507, response-desired receiving exchange number information 508, and an error check 509, to a communication slave S.

The communication slave S receives, processes, and stores the communication master signal 500 of the communication master M. And, if exchange number information of the communication slave S is included in the response-desired receiving exchange number information 508 of the communication master signal 500, the communication slave S transmits a response signal with reference to the calling exchange number information 506 of the communication master signal 500.

At this point, the communication slave S generates a response signal including calling exchange number information 510, data information 512, response-desired receiving exchange number information 512, and an error check 513 by means of a broadcast to transmit data to all inverters connected to the inverter system.

When desiring for a response from the communication slave 1 S1, the communication master generates a communication master signal 500 including calling exchange number information 506, data information 507, receiving exchange number information of the communication slave 1 S1, and an error check 509 by means of a broadcast to transmit to a communication line.

The communication slave 1 S1 receives, processes, and stores the communication master signal 500 of the communication master. If the exchange number information of the communication slave 1 S1 is included in the response-desired receiving exchange number information 508 of the communication master signal 500, the communication slave 1 S1 transmits a response signal 503 with reference to the calling exchange number information 506 of the communication master signal 500. At this point, the communication slave 1 S1 generates a response signal including exchange number information 510 thereof, data information 511, exchange number information of the communication master 512, and an error check 513 by means of a broadcast to transmit data to all inverters connected to the inverter system.

Consequently, the communication master may acquire desired information from the communication slave 1 S1 and also other inverters connected to the inverter system may process and store all information of the communication master and the communication slave 1 S1.

When desiring for a response from the communication slave 2 S2, the communication master M transmits a communication master signal 501 including calling exchange number information 514, data information 515, receiving exchange number information 516 of the communication slave 2 S2, and an error check 517 to the communication line.

The communication slave 2 S2 receives, processes, and stores the communication master signal 501 from the communication master M. If the exchange number information of the communication slave 2 S2 is included in the response-desired receiving exchange number information 516 of the communication master signal 501, the communication slave 2 S2 transmits a response signal 504 with reference to the calling exchange number information 514 of the communication master signal 501. At this point, the communication slave 2 S2 generates a response signal including exchange number information 518 thereof, data information 519, exchange number information of the communication master 520, and an error check 513 to transmit data to all inverters connected to the inverter system.

And thus, the communication master may acquire desired information from the communication slave 2 S2 and also other inverters connected to the inverter system may process and store all information of the communication master, the communication slave 1 S1, and the communication slave 2 S2.

When desiring for a response from the communication slave n Sn, the communication master generates a communication master signal 502 including calling exchange number information 522, data information 523, exchange number information 524 of the communication slave n Sn, and an error check 525 by means of a broadcast to transmit to the communication line.

The communication slave n Sn receives, processes, and stores the communication master signal 503 from the communication master. If the exchange number information of the communication slave n Sn is included in the response-desired receiving exchange number information 524 of the communication master signal 502, the communication slave n Sn transmits a response signal 505 with reference to the calling exchange number information 522 of the communication master signal 502. At this point, the communication slave n Sn generates a response signal including exchange number information 526 thereof, data information 527, exchange number information of the communication master 528, and an error check 529 by means of a broadcast to transmit data to all inverters connected to the inverter system.

And thus, the communication master may acquire desired information from the communication slave n Sn and also other inverters connected to the inverter system may process and store all information of the communication master, the communication slave 1 S1, the communication slave 2 S2, and the communication slave 3 S3.

Figure 6:
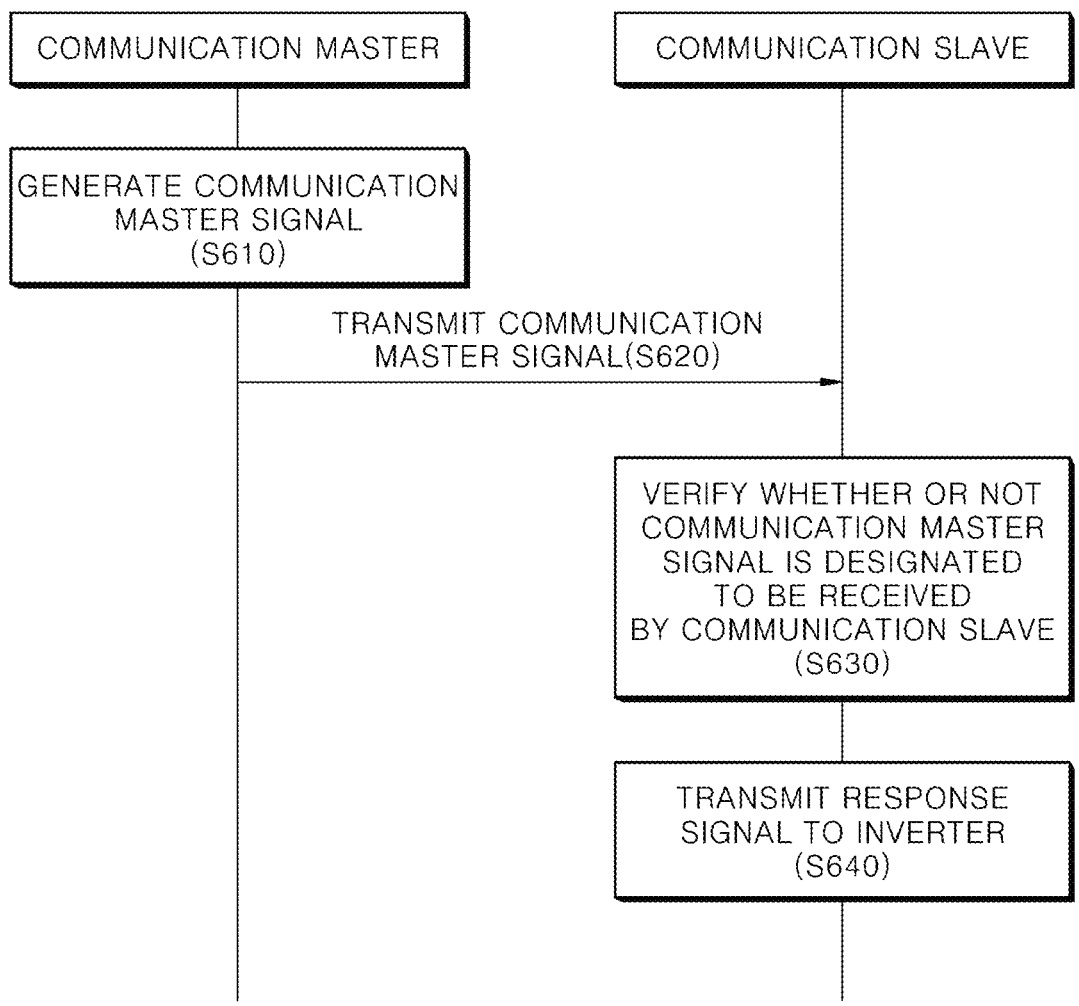
FIG. 6 is a flowchart for describing one embodiment of a control method according to one embodiment of the present disclosure.

FIG. 6 is a flowchart for describing one embodiment of an inverter control method according to some embodiments of the present disclosure. In one embodiment of FIG. 6, a master inverter among inverters of the inverter system may serve as a communication master, and the remaining follower inverters may serve as communication slaves to transmit and receive a communication signal. Also, in another embodiment of FIG. 6, one inverter among the follower inverters of the inverter system may serve as a communication master, and the master inverter and the remaining follower inverters may serve as communication slaves to transmit and receive a communication signal.

With reference to FIG. 6, the communication master generates a communication master signal in Operation S610 to transmit the communication master signal to the communication slave in Operation S620. At this point, the communication master may generate the communication master signal including calling exchange number information, data information, response-desired receiving exchange number information, and an error check to transmit to the communication slave.

When receiving the communication master signal from the communication master, the communication slave verifies that the communication master signal is designated to be received by the communication slave in Operation S630. If the communication master signal is designated to be received by the communication slave, the communication slave transmits a response signal with respect to the communication master signal to inverters of the inverter system in Operation S640.

At this point, if the exchange number information of the communication slave is included in the response-desired receiving exchange number information of the communication master signal, the communication slave may confirm that the communication master signal has been designated to be received by the communication slave. After confirming that the communication master signal has been designated to be received by the communication slave, the communication slave may generate a response signal including calling exchange number information thereof, data information, exchange number information of the communication master, and an error check to transmit to inverters of the inverter system. As described above, in accordance with some embodiments of the present disclosure, all inverters of the inverter system may receive and process a communication signal to be transmitted from one of the inverters, so that a malfunction or a communication interruption occurred in an inverter may be inspected by other inverters. Also, in accordance with some embodiments of the present disclosure, even though a malfunction occurs in an inverter set as a communication master, other inverter may serve as the communication master.

Therefore, in the inverter system according to some embodiments of the present disclosure, all inverters of the inverter system may receive and process a communication signal to be transmitted from one of the inverters, so that a malfunction or a communication interruption occurred in an inverter may be inspected by other inverters.

Additionally, in the inverter system according to some embodiments of the present disclosure, even though a malfunction occurs in an inverter set as a communication master, other inverter may serve as the communication master.

Although the embodiments have been described with reference to a number of illustrative embodiments thereof, it should be understood that numerous other modifications and embodiments can be implemented without departing from the scope of the present disclosure. The scope of the present disclosure is not limited to these embodiments, and it should be construed by the appended claims, along with the full range of equivalents to which such claims are entitled.

As described above, the present disclosure has been described with reference to a limited number of illustrative embodiments thereof and the accompanying drawings, it is not limited to these embodiments, and it should be understood that numerous other modifications and embodiments can be devised by those skilled in the art that will fall within the spirit and scope of the principles of this disclosure. Therefore, the spirit of the present disclosure should be construed by the appended claims, along with the full range of equivalents to which such claims are entitled.

What is claimed is:

1. A method of controlling a plurality of inverters in which one inverter in an inverter system including the plurality of inverters is set as a communication master configured to control other inverters set as communication slaves, the method comprising:

generating, by the communication master, a communication master signal;

transmitting, by the communication master, the communication master signal to the communication slaves by way of broadcast;

verifying, by each of the communication slaves, whether or not the communication master signal is designated to be received by each of the communication slaves based on whether exchange number information of each of the communication slaves is included in receiving exchange number information of the communication master signal;

when the exchange number information of each of the communication slaves is included in the receiving exchange number information of the communication master signal, transmitting, by each of the communication slaves, a response signal with respect to the communication master signal to all of the plurality of inverters included in the inverter system by way of broadcast; and when the exchange number information of each of the communication slaves is not included in the receiving exchange number information of the communication master signal, processing and storing, by each of the communication slaves, the communication master signal transmitted by way of broadcast by the communication master, wherein each of the communication slaves included in the inverter system processes and stores the response signal transmitted by way of broadcast by other communication slaves regardless of whether the exchange number information of each of the communication slaves is included in the receiving exchange number information of the communication master signal and the response signal, and wherein the receiving exchange number information of the communication master signal includes information about a communication slave from which a response is requested in response to the communication master signal.

2. The method of claim 1, wherein generating the communication master signal includes:

generating the communication master signal including calling exchange number information, data information, the receiving exchange number information, and an error check.

3. The method of claim 2, wherein transmitting the response signal with respect to the communication master signal to all of the plurality of the inverters included in the inverter system includes:

generating the response signal including calling exchange number information, data information, exchange number information of the communication master, and an error check to transmit to all of the plurality of inverters included in the inverter system.

4. The method of claim 1, wherein, when a malfunction occurs in the one inverter set as the communication master, one among the other inverters set as the communication slaves is set as the communication master.

5. The method of claim 1, further comprising inspecting, by at least one of the communication slaves, whether a malfunction or a communication interruption has occurred.

* * * * *